July 22, 1930.  W. HEERDT  1,771,218
APPARATUS FOR MEASURING GRANULATED OR POWDERED MATERIALS
Filed Jan. 29, 1926  2 Sheets-Sheet 1
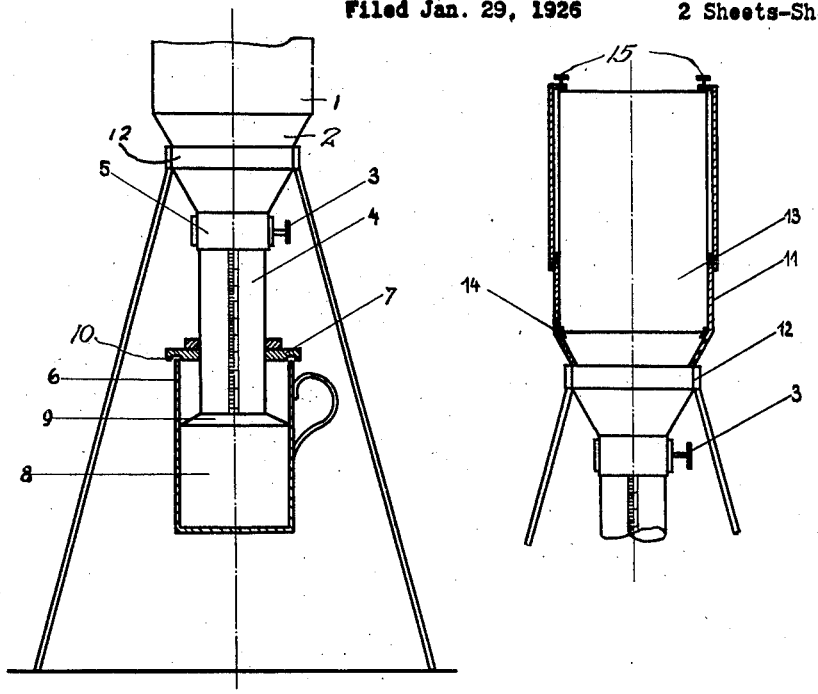
Fig. I.   Fig. II.
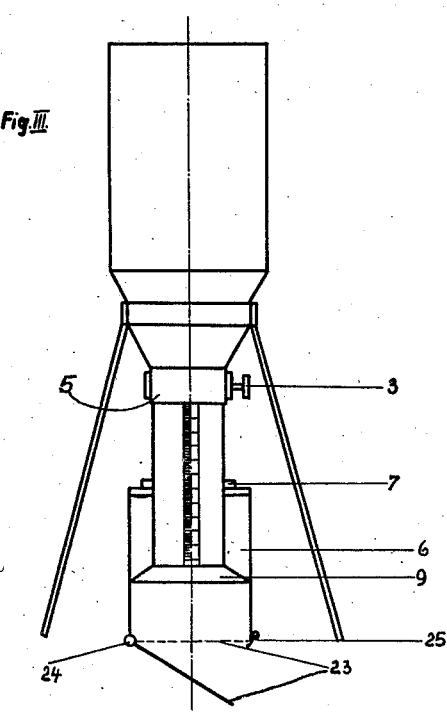
Fig. III.
Inventor:
Walter Heerdt,
by J.O. Mooter
Atty.

July 22, 1930.  W. HEERDT  1,771,218
APPARATUS FOR MEASURING GRANULATED OR POWDERED MATERIALS
Filed Jan. 29, 1926  2 Sheets-Sheet 2
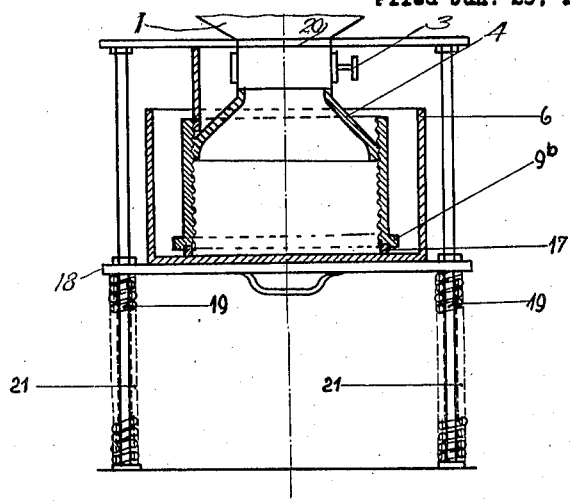
Fig. VII.
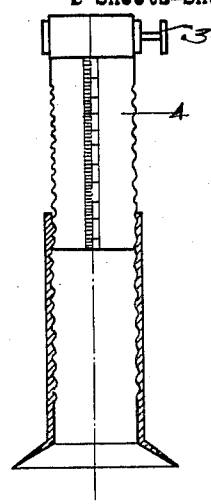
Fig. VI.
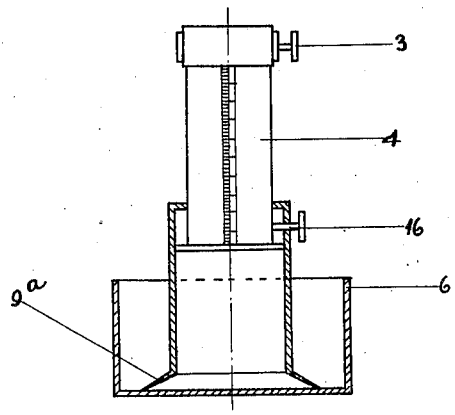
Fig. IV.
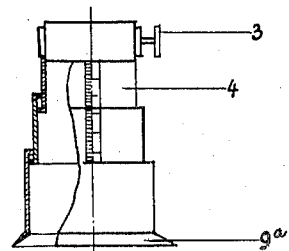
Fig. V.

Patented July 22, 1930

1,771,218

UNITED STATES PATENT OFFICE

WALTER HEERDT, OF FRANKFORT-ON-THE-MAIN, GERMANY, ASSIGNOR TO DEUTSCHE GOLD & SILBER SCHEIDEANSTALT, VORMALS ROESSLER, OF FRANKFORT-ON-THE-MAIN, GERMANY, A CORPORATION

APPARATUS FOR MEASURING GRANULATED OR POWDERED MATERIALS

Application filed January 29, 1926, Serial No. 84,530, and in Germany January 30, 1925.

The object of this invention is to provide a means for measuring definite amounts of granulated or powdered material. The apparatus of this invention is particularly suited for use in fumigation by means of toxic gases such as HCN absorbed in granular materials such as charcoal, "kieselguhr," and the like. In using these fumigants it is necessary to vary the amount of material used according to the size of the space or room to be treated. If these doses are measured in the open considerable loss of the fumigant gas would ensue and would result in an increased hazard to the operators.

In the apparatus of my invention the measuring is accomplished with a minimum of such losses. The invention is best described in connection with the accompanying drawings.

Figure I shows a complete set up of a simple type of my apparatus mounted on a tripod. Figure II is a partial view of the apparatus shown in Figure I and also shows an inverted shipping container attached to the measuring device. Figure III shows the same type of apparatus as Figure I with the exception of the receiver, which has a hinged bottom in Figure III, Figure IV shows a telescopic feed tube of two sections the lower of which has a flange not fitting against the walls of the receiver. Figure V is a view of a telescopic feed tube of three sections, Figure VI shows a feed tube of two sections with one section screwing into the other. Figure VII illustrates a type of my apparatus which is kept tightly closed by means of a spring supported platform on which the receiver rests.

Figure I shows the simplest form of my invention. The vessel 1 mounted on a tripod or other suitable support serves to contain the stock of granular substance. This vessel is provided with a gas tight cover 2. The lower portion of the vessel communicates with a stop-cock, slide or gate valve 3 of large size so as to allow a free flow of material when open. Below this valve comes the measuring device which is the main object of this invention. This measuring device consists essentially of an adjustable telescopic device wherein the amount of material discharged is regulated by closing or extending the telescopic parts so as to vary the volume of the interior of the tubes or the distance of the bottom of the receiver from the lower end of the discharging tube. In Figure I the telescopic parts are composed of a graduated filling tube 4 connected to the valve block 5, and the receptacle 6 into which the material is to be discharged. The guide block and stop 7 is adjustable along the length of the tube 4 and is set to any desired graduation. The position of this block determines the extent to which the tube 4 will enter the container 6, thus determining the amount of material measured. The lower end of tube 4 is provided with a flange 9 which fits snugly into the receiver. The graduations on the tube 4 are calibrated so as to measure very closely the total amount of material contained in space 8 and the hollow tube 4. The operation of this apparatus is simple. From tables or other data the desired amount of fumigant is determined and the block 7 is adjusted accordingly on the tube 4. The receiver 6 is then placed in position by sliding it up around flange 9 so that its top fits gas tight against a gasket which can be inserted in the groove 10. Valve 3 is now opened and the material allowed to flow downward till it has filled the space 8 and the tube 4. The valve is now closed and the receiver 6 is pulled down away from the tube. As the receiver moves downward the material in the tube 4 also flows into the vessel and the desired dose or charge is thereby obtained.

Several modifications of this apparatus may be had within the scope of this invention. For example the vessel 1 may be the original bulk transportation container. Its use is shown in Fig. II. The upper portion of the measuring device is fashioned as a hopper 11 and removable from the supporting frame 12. The shipping container 13 is first opened and then the measuring assembly inverted over the container so that the top of the container is inside the hopper 11 and tight against a suitable gasket at 14; clamps with set screws 15 are then adjusted so as to hold the container firmly in the hopper. This assembly is now inverted and placed in the frame 12 and operated as stated above.

Instead of using a removable receptacle which has to be slid over the telescopic tube and into which the granular material is to be charged, the apparatus may be provided with a receiver which is fixed to the adjustable guide block as shown in Fig. III. The receptacle 6 is rigidly joined to the guide block 7 so that the connection is gastight. In order to be able to discharge the contents of the receiver the latter is provided with a bottom 23 which may be made to tilt around the hinge 24, it being held in position by the aid of the fastener 25. The bottom may also have the form of a shell which is slid over the lower part of the receiver.

The telescopic measuring device is capable of several adaptations. Fig. IV shows the feed tube itself of telescopic construction. In this case the flange 9ª may have as in Figure I, a snug fit inside the receiver and thus form a three section measuring device or as shown in Figure IV the flange may be smaller than the inside of the receiver and be placed tightly against the bottom. The necessary graduations are of course adjusted accordingly or two sets of graduations may be provided. Figure V shows the use of a discharge tube of three telescopic sections. This would be adaptable, as in the case of the apparatus of Fig. IV, to the size of the vessel. These telescopic feed tubes would usually require set screws to hold them in place as shown by 16 in Fig. IV. In Figures VI and VII are shown types of telescopic feed and measuring tubes in which the adjustment is very flexible and no set screws are required. In these two cases the one section screws into the other and the regulated dose is obtained by turning the lower section. Figure VII shows the use of a gas tight gasket 17 at the bottom of the flange 9ᵇ to secure better contact between the supply tube and the bottom of the receiver.

It is at times better to use some mechanical holder for the receiver during the filling operation particularly when large receivers are in use. One such mechanical support is shown in Figure VII. The container 1, valve 3, feed cylinder 4, flange 9ᵇ, gasket 17 and receiver 6 are as previously explained except that flange 9ᵇ is in this instance part of the adjustable stop. The receiver 6 stands on a platform 18 which is slidably arranged on guide rods 19. These guide rods form a part of a frame-work which is fastened to the measuring unit for example, as at 20. The platform 18 is pressed upward by coil springs 21 and thus forces the receiver bottom into close contact with the flange 9ᵇ or gasket 17 if this is used. To remove the receiver, the platform is pulled down to allow the vessel to be disengaged from the feed tube.

As has been seen, a great variety of structures are possible within the scope of my invention and I do not desire to be limited to any one.

I claim:

1. A measuring device for granulated or powdered material comprising a tube means connected permanently to a source of supply of material to be measured, a closure device in said tube adjacent said source of supply, a receiver coacting with the lower end of said tube, fitting snugly thereto and removable therefrom, and an adjustable cover and stop for said receiver on said tube.

2. A measuring device for granulated or powdered material comprising a tube means connected to a source of supply of material to be measured, a closure device in said tube adjacent said source of supply, an adjustable stop on said tube, and a receiver for said material adapted to coact with said stop and said tube to form a telescopic measuring device therewith.

Signed at Frankfort-on-the-Main, Germany, this 13th day of January, A. D. 1926.

WALTER HEERDT.